United States Patent [19]

Mason

[11] 3,766,940
[45] Oct. 23, 1973

[54] PRESSURE LATCHING CHECK VALVE
[75] Inventor: John P. Mason, Midland, Tex.
[73] Assignee: Esso Production Research Company, Houston, Tex.
[22] Filed: Aug. 25, 1971
[21] Appl. No.: 174,842

[52] U.S. Cl.......... 137/460, 137/519.5, 137/533.11, 137/DIG. 2, 277/164
[51] Int. Cl............................................. F16k 17/24
[58] Field of Search................ 137/460, 498, 519.5, 137/525, 533.11, DIG. 2, 516.25, 516.27, 516.29; 277/164

[56] References Cited
UNITED STATES PATENTS
398,111   2/1889   Abbot et al................ 137/516.25 X
3,224,455  12/1965  Alfieri................................ 137/113
3,096,825  7/1963   Clark, Jr..................... 137/533.11 X
3,406,979  10/1968  Weber............................ 277/164 X Primary Examiner—Martin P. Schwadron
Assistant Examiner—David R. Matthews
Attorney—Thomas B. McCulloch et al.

[57] ABSTRACT

A check valve contains two chambers connected together by a restricted flow passageway and a valve element movable from one of the chambers to the other chamber through the flow passageway in response to fluid pressure changes. At fluid flow velocities below a predetermined velocity fluid flows through the chambers and the flow passageway therebetween unimpeded. When the fluid's velocity rises above the predetermined velocity the valve element moves to close the flow passageway to flow of fluid therethrough. With the valve element positioned on the passageway stopping or significantly restricting flow of fluid, increases in fluid pressure force the valve element through the restricted flow passageway into the other chamber to trap the valve element therein to prevent flow of fluid in either direction through the chambers and the flow passageway.

20 Claims, 12 Drawing Figures

PATENTED OCT 23 1973 3,766,940
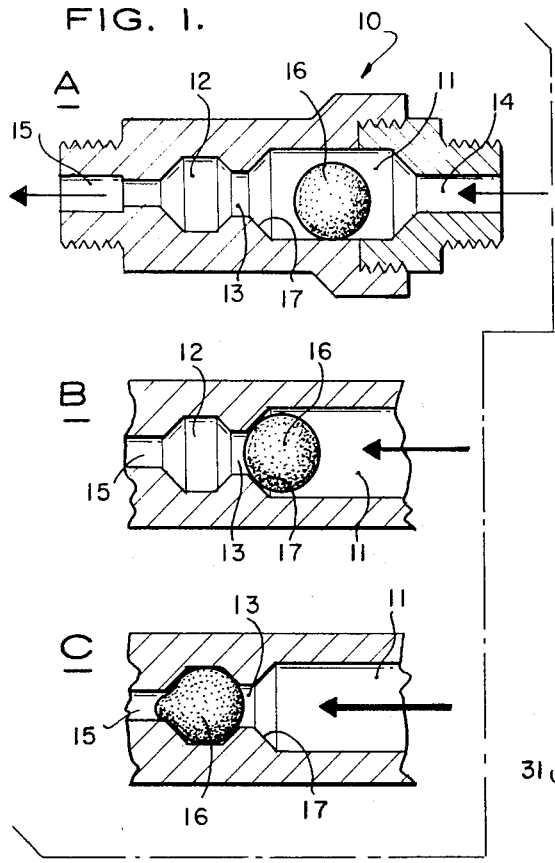
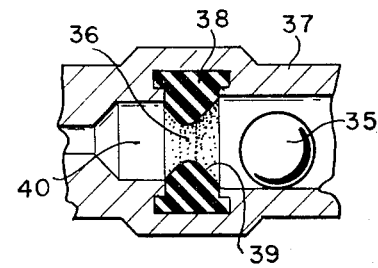
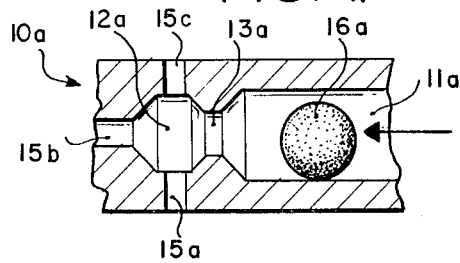
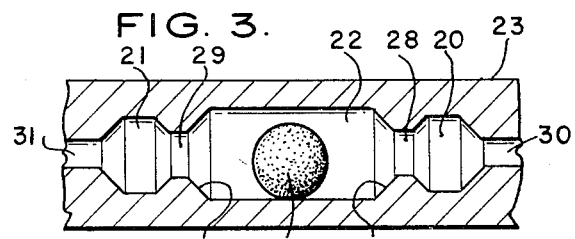
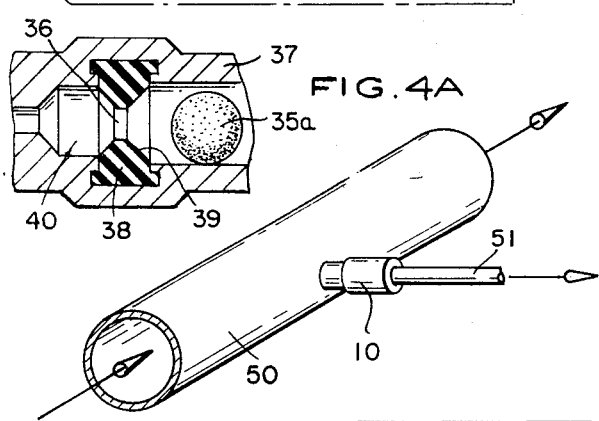
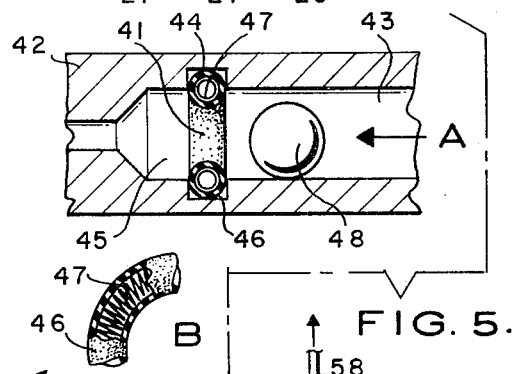
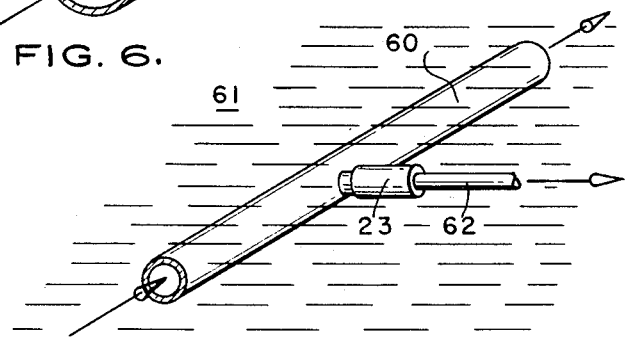
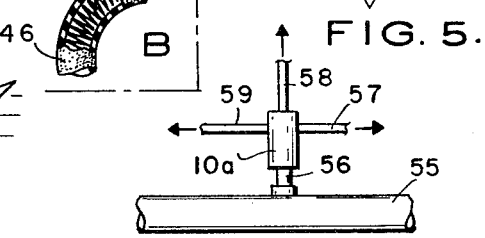
INVENTOR.
JOHN P. MASON,
BY
JOHN S. SCHNEIDER,
ATTORNEY.

PRESSURE LATCHING CHECK VALVE

BACKGROUND OF THE INVENTION

The present invention concerns check valves and, in particular, a pressure latching type check valve for use in remote control systems.

Gauges used to monitor the fluid pressure in flow or process equipment are frequently installed remote from the equipment with the sensed media piped through extension tubing to the gauges. If the extension tubing is broken, the sensed media may leak out or ambient fluid may leak in. If the process pressure fluctuates about ambient pressure, fluid will alternately leak in and out. Failure of instrument lines may require that an entire system be shut off.

Check valves are often installed in critical instrument lines to prevent possible leakage. These valves are designed to allow flow in only one direction or to stop excessive flow. The performance of these check valves is strongly dependent upon the condition of the valve seats. Through long service the check valve seats may be damaged and not provide tight seals when needed. Also, if the system pressure fluctuates about ambient, a double acting check valve is required which must repeatedly seal, shift with the direction of pressure, and reseal until the line is fixed.

The present invention provides a check valve which will positively seal a broken line. The valve is particularly adaptable for use in remote control systems submerged in water or any fluid.

SUMMARY OF THE INVENTION

A pressure latching check valve comprising a valve housing for connection into a flowline and containing two flow chambers; a restricted flow passageway between said two flow chambers; a flow port arranged on each chamber; and a valve member normally larger in size than the flow passageway arranged in one of the chambers and movable in response to increased fluid flow velocity to close off the flow passageway and thereafter movable through the flow passageway into the other chamber in response to increased fluid pressure to trap the valve member in the other chamber. The valve member or the wall of the flow passageway or both are sufficiently resilient to permit passage of the valve member through the flow passageway. The check valve may be made double acting by providing a trap chamber for the valve member on each side of a main check valve chamber.

BRIEF DESCRIPTION OF THE DRAWINGS

FIGS. 1A, B and C illustrate various operational positions of the check valve in accordance with one embodiment of the invention;

FIG. 2 illustrates a check valve similar to that shown in FIG. 1A but in which the trap chamber is provided with multiple ports;

FIG. 3 illustrates another embodiment of the invention in which the check valve of the invention is double acting;

FIG. 4 illustrates still another embodiment of the invention in which the wall of the restricted flow passageway is made of resilient material;

FIG. 4A illustrates another embodiment of the invention in which both the valve member and the wall of the restricted flow passageway are made of resilient material;

FIGS. 5A and 5B illustrate another embodiment of the invention in which the restricted flow passageway is formed by an expandable-contractible O-ring; and FIGS. 6, 7 and 8 illustrate three uses for the check valve of the invention.

DESCRIPTION OF THE PREFERRED EMBODIMENTS OF THE INVENTION

Referring to FIG. 1A, there is shown a valve housing 10 containing a flow chamber 11 and a trap chamber 12 between which there is a restriction or restricted flow passageway 13. The interior walls of valve housing 10 are formed of inelastic, rigid material. Chamber 11 has a fluid inlet port 14, the direction of fluid flow being indicated by the arrowed lines, and chamber 12 has a fluid outlet port 15. A malleable generally spherical or ball shaped valve member 16, larger than restriction 13 but having sufficient resiliency to be forced through the restriction under pressure, is positioned in chamber 11 when fluid flowing through valve housing 10 is flowing under normal conditions at or below a preselected velocity.

As seen in FIG. 1B upon an increase in velocity above the preselected velocity valve member 16 is carried by the flow of fluids through chamber 11 onto restriction 13 and seats on valve seat 17 in chamber 11 to block (or partially block) flow of fluids through valve housing 10.

As shown in FIG. 1C, increasing the pressure of fluids in chamber 11 forces valve member 16 through restricted passageway 13 and stuffs valve member 16 into trap chamber or cavity 12 which confines valve member 16 tightly enough to stop flow of fluids in either direction, that is, through outlet port 15 or through restricted passageway 13. The relative resiliencies of valve members 16 and the material forming restriction 13, the area of the restriction 13, and the relative sizes of valve member 16 and restriction 13 controls the fluid pressure required to set the check valve.

The check valve may be either permanent or resetable by reverse pressure by controlling the sizes of inlet port 13 and outlet port 15 of trap chamber 12. The check valve also may be selectively resetable by using different size inlet and outlet ports 13 and 15, respectively.

In FIGS. 2 a trap chamber 12a is provided with three outlet ports 15a, 15b and 15c. The operation of the valve is similar to the operation described with respect to FIGS. 1A to 1C. When valve member 16a is forced through restricted passageway 13a all three outlet ports and passageway 13a are sealed off.

A double acting check valve is illustrated in FIG. 3. A valve housing 23 contains two trap chambers 20 and 21 positioned on opposite sides of a flow chamber 22. A valve member 24, similar to valve member 16, is positioned in chamber 22. When fluid flowing through valve housing 23 in either direction exceeds the design level velocity, valve member 24 is forced against either seat 26 or seat 27 in chamber 22 depending upon the direction of the fluid flow. With the valve member seated in either of the restricted flow passageways 28 or 29, increased pressure of the fluids in the direction of previous flow through valve housing 23 forces valve member 24 through the restricted passageway into either chamber 20 or 21 to stop flow through the outlet ports 30 or 31.

The modification illustrated in FIG. 4 employs a rigid valve member 35 and a restricted passageway 36 formed in a valve housing 37 by resilient or deformable material 38. Valve member 35 is moved onto seat 39 formed by material 38 upon increased fluid velocity in the direction of the arrows above a preselected design velocity to stop (or partially stop) flow of fluids through valve housing 37. With valve member 35 seated on passageway 36 increased fluid pressure in the direction of the arrows forces valve member 35 through restricted passageway 36 into trap chamber 40 in which position valve member 35 blocks fluid flow in either direction through valve housing 37.

The modification illustrated in FIG. 4A employs a resilient valve member 35a and a restricted passageway 36 formed in valve housing 37 by resilient or deformable material 38. Valve member 35a is moved onto seat 39 formed by material 38 upon increased fluid velocity above a preselected design velocity to stop (or partially stop) flow of fluids through valve housing 37. With valve member 35a seated on passageway 36 increased fluid pressure forces valve member 35a through restricted passageway 36 into trap chamber 40 in which position valve member 35a blocks fluid flow in either direction through valve housing 37. Thus, either the valve member or the restriction or both may have resilience.

The operation of the embodiment of FIGS. 5A and 5B is similar to the operation of the embodiment of FIG. 4. However, the formation of the restricted passageway is different. In FIGS. 5A and 5B a restricted flow passageway 41 is formed by a hollow O-ring 46 made of resilient material surrounding a closed circular coiled spring 47 and positioned in a recess 44 formed in a valve housing 42. A rigid, nondeformable valve member 48 seats in the opening in the O-ring upon increased fluid velocity above a preselected velocity to close off flow of fluid through the O-ring. With the valve member in that position increased fluid pressure in chamber 43 forces the valve member through the O-ring into trap chamber 45 as O-ring 46 expands and then springs back to its original shape and size.

An application of the check valve shown in FIGS. 1A, B and C is illustrated in FIG. 6. A flow conduit 50, conveying, for example, oil production fluids, has connected to it a line 51 leading to a pressure recorder, not shown. Check valve 10 is positioned in line 51. The pressure in conduit 50 is assumed greater than in the media surrounding the conduit. A break or leak in line 51 would cause the fluid velocity in conduit 50 to increase forcing valve member 16 onto seat 17 to prevent loss of production fluid flowing in conduit 50. With fluid flow thus stopped, no serious loss of fluid from conduit 50 will occur while the trouble is diagnosed. The broken line can then be permanently sealed from a remote location, if desired, by increasing pressure in conduit 50 to force valve member 16 through restriction 13 into trap chamber 12. This feature is especially advantageous if conduit 50 is submerged at deep depths in water (FIG. 8) or is located in some other type problem environment.

In FIG. 7 use of a multiple port outlet is illustrated. A conduit 55, a supply header for a hydraulic control system, has connected to it a series of branch lines 56, only one of which is shown. A three-way valve housing 10a, such as described with reference to FIG. 2, is positioned in branch line 56. Additional branch lines 57, 58 and 59 are connected to the ports 15a, 15b and 15c (FIG. 2) and lead to various functions in the hydraulic control system. If one or more of the branch lines 57, 58 or 59 were broken, the leak would be sealed off permitting other parts of the control system controlled by other branch lines 56 to operate normally without excessive loss of fluid. The damaged branch line could be sealed permanently by increasing pressure in conduit 55 to trap valve member 16a in trap chamber 12a and block flow through line 56 to or from branch lines 57, 58 and 59. This application would be valuable in aircraft, submarine or process control systems where some control functions could be lost without loss of all control.

In FIG. 8 a conduit 60, shown submerged in a water environment 61, has connected to it a line 62 on which is located one of the check valves of the invention, as for example, the double acting check valve of FIG. 3. Valve member 24 in housing 23 functions to close off and block flow of fluid through the valve housing in either direction depending upon the direction of flow of fluids through line 62.

The arrangement shown in FIG. 8 could be used in either of the application described above with reference to FIGS. 6 and 7. The pressure in conduit 60 could be either higher or lower or fluctuating above and below the pressure of the water. If the pressure in conduit 60 were higher than the pressure of the water, the valve would operate as described with reference to FIGS. 6 or 7. If the external water pressure were higher, the valve would be set by lowering the pressure in conduit 60. Such an arrangement is especially useful in high pressure piping systems located at deep depths in the ocean.

An operator at a remote station may, by use of controls to shift valves, increase fluid pressure to set the check valve which would remotely close any damaged line in which it is positioned until repairs can be made. The check valve is preferably designed to set at pressures well above expected normal system operating pressures to avoid accidental setting. The relative sizes of the inlet and outlet ports would prevent unlatching when the fluid pressure is reversed.

The check valve does not have to block flow in both directions and its use is not restricted to instrument lines. It may be used in any branch line of a flow or hydraulic or pneumatic control system to protect the main supply from breaks in inaccessible branches. Additional examples for use of the check valve are fuel and power fluid systems or control systems for aircraft, space vehicles, submarines, exposed subsea systems, or hazardous environment systems such as nuclear facilities.

The resilient material referred to herein may suitably be a durable, corrosion-resistant rubber or rubber like compound having the proper resiliency characteristics.

Changes and modifications may be made in the illustrative embodiments of the inventions shown and/or described herein without departing from the scope of the invention as defined in the appended claims.

Having fully described the objects, advantages, apparatus and operation of my invention, I claim:

1. A pressure latching check valve comprising:
   a valve housing for connection into a fluid flow line and containing a flow chamber and a trap chamber and a restricted flow passageway or restriction therebetween;

at least one flow port arranged on each of said chambers; and a valve member normally larger than said restriction initially arranged in said flow chamber capable of being moved to close off flow of fluids through said restriction in response to changes in fluid velocity through said chambers and being moved from said flow chamber to said trap chamber through said restriction in response to changes in fluid pressure in said flow chamber, said valve member being resilient to permit movement of said valve member through said restriction into said trap chamber, said valve member preventing flow of fluids through said trap chamber when said valve member is positioned in said trap chamber.

2. A check valve as recited in claim 1 in which said trap chamber contains a plurality of ports and said valve member prevents flow of fluids through one or more of said ports when said valve member is positioned in said trap chamber.

3. A check valve as described in claim 1 in which said valve is double acting and includes an additional trap chamber connected to said flow chamber through another restricted flow passageway or restriction permitting said valve member to move into either of said trap chambers through said restrictions dependent upon the direction of fluid flow, said flow port on said flow chamber being said restricted flow passageway between said flow chamber and said additional trap chamber.

4. A check valve as described in claim 1 in which said valve member comprises resilient material.

5. A check valve as recited in claim 1 in which the relative resiliencies of said valve member and said restriction, the area of said restriction and the relative sizes of said valve member and said restriction control the fluid pressure required to move said valve member through said restriction and set the check valve.

6. A pressure latching check valve comprising:
a valve housing for connection into a fluid flowline and containing a flow chamber and a trap chamber and a restricted flow passageway or restriction therebetween;
at least one flow port arranged on each of said chambers; and
a valve member normally larger than said restriction initially arranged in said flow chamber capable of being moved to close off flow of fluids through said restriction in response to changes in fluid velocity through said chambers and being moved from said flow chamber to said trap chamber through said restriction in response to changes in fluid pressure in said flow chamber, said restriction being resilient to permit movement of said valve member through said restriction into said trap chamber, said valve member preventing flow of fluids through said trap chamber when said valve member is positioned in said trap chamber.

7. A check valve as described in claim 6 in which said restriction comprises resilient means.

8. A check valve as described in claim 7 in which said resilient means comprises resilient material.

9. A check valve as described in claim 7 in which said resilient means comprises a closed spring surrounded by resilient material.

10. A check valve as recited in claim 6 in which said trap chamber contains a plurality of ports and said valve member prevents flow of fluids through one or more of said ports when said valve member is positioned in said trap chamber.

11. A check valve as described in claim 6 in which said valve is double acting and includes an additional trap chamber connected to said flow chamber through another restricted flow passageway or restriction permitting said valve member to move into either of said trap chambers through said restrictions dependent upon the direction of fluid flow, said flow port on said flow chamber being said restricted flow passageway between said flow chamber and said additional trap chamber.

12. A check valve as recited in claim 6 in which the relative resiliencies of said valve member and said restriction, the area of said restriction and the relative sizes of said valve member and said restriction control the fluid pressure required to move said valve member through said restriction and set the check valve.

13. A pressure latching check valve comprising:
a valve housing for connection into a fluid flowline and containing a flow chamber and a trap chamber and a restricted flow passageway or restriction therebetween;
at least one flow port arranged on each of said chambers; and
a valve member normally larger than said restriction initially arranged in said flow chamber capable of being moved to close off flow of fluids through said restriction in response to changes in fluid velocity through said chambers and being moved from said flow chamber to said trap chamber through said restriction in response to changes in fluid pressure in said flow chamber, said valve member and said restriction being resilient to permit movement of said valve member through said restriction into said trap chamber, said valve member preventing flow of fluids through said trap chamber when said valve member is positioned in said trap chamber.

14. A check valve as recited in claim 13 in which said trap chamber contains a plurality of ports and said valve member prevents flow of fluids through one or more of said ports when said valve member is positioned in said trap chamber.

15. A check valve as described in claim 13 in which said valve is double acting and includes an additional trap chamber connected to said flow chamber through another restricted flow passageway or restriction permitting said valve member to move into either of said trap chambers through said restrictions depending upon the direction of fluid flow, said flow port on said flow chamber being said restricted flow passageway between said flow chamber and said additional trap chamber.

16. A check valve as described in claim 13 in which said valve members comprises resilient material.

17. A check valve as described in claim 13 in which said restriction comprises resilient means.

18. A check valve as described in claim 17 in which said resilient means comprises resilient material.

19. A check valve as described in claim 17 in which said resilient means comprises a closed spring surrounded by resilient material.

20. A check valve as recited in claim 13 in which the relative resiliencies of said valve member and said restriction, the area of said restriction and the relative sizes of said valve member and said restriction control the fluid pressure required to move said valve member through said restriction and set the check valve.

* * * * *